(12) United States Patent
Li et al.

(10) Patent No.: US 9,083,411 B2
(45) Date of Patent: Jul. 14, 2015

(54) DEVICE AND METHOD OF CHANNEL INFORMATION FEEDBACK FOR MULTI-CELL MIMO

(75) Inventors: Dong Li, Shanghai (CN); Hao Liu, Shanghai (CN); Hongwei Yang, Shanghai (CN); Yang Song, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 301 days.

(21) Appl. No.: 13/521,901

(22) PCT Filed: Jan. 13, 2010

(86) PCT No.: PCT/CN2010/000057
§ 371 (c)(1),
(2), (4) Date: Jul. 12, 2012

(87) PCT Pub. No.: WO2011/085516
PCT Pub. Date: Jul. 21, 2011

(65) Prior Publication Data
US 2012/0289275 A1 Nov. 15, 2012

(51) Int. Cl.
*H04B 17/00* (2006.01)
*H04B 7/06* (2006.01)
*H04B 7/02* (2006.01)

(52) U.S. Cl.
CPC .............. *H04B 7/0632* (2013.01); *H04B 7/024* (2013.01); *H04B 7/0626* (2013.01)

(58) Field of Classification Search
None
See application file for complete search history.

(56) References Cited

U.S. PATENT DOCUMENTS

| 2007/0174038 A1* | 7/2007 | Wang et al. ................. 704/1 |
| 2009/0010215 A1 | 1/2009 | Kim et al. |
| 2010/0002607 A1 | 1/2010 | Kim et al. |
| 2010/0034146 A1* | 2/2010 | Hou et al. ................... 370/328 |

(Continued)

FOREIGN PATENT DOCUMENTS

| CN | 101207896 A | 6/2008 |
| CN | 101373998 A | 2/2009 |

(Continued)

OTHER PUBLICATIONS

International Search Report for PCT/CN2010/000057 dated Oct. 21, 2010.

(Continued)

*Primary Examiner* — Nay A Maung
*Assistant Examiner* — Alejandro Rivero
(74) *Attorney, Agent, or Firm* — Fay Sharpe LLP (57) ABSTRACT

A mobile terminal is provided in the present invention, comprising: a channel state information feedback calculating unit configured to calculate a channel state information feedback between the mobile terminal and a serving cell of the mobile terminal and those between the mobile terminal and all cooperating cells; a channel quality information feedback calculating unit configured to calculate a channel quality information feedback for the serving cell of the mobile terminal; and a transmission unit configured to transmit the channel state information feedbacks and the channel quality information feedback to the serving cell. The present invention greatly improves the performance of a LTE-A system and greatly reduces feedback overhead. The present invention is a scalable feedback solution and may be flexibly applied to various coordinated multipoint transmission scenarios.

9 Claims, 4 Drawing Sheets

(56) References Cited

U.S. PATENT DOCUMENTS

2010/0220601 A1* 9/2010 Vermani et al. ............... 370/248
2011/0206106 A1* 8/2011 Mallik et al. .................. 375/226

FOREIGN PATENT DOCUMENTS

| CN | 101453259 A | 6/2009 |
| EP | 2182663 A1 | 5/2010 |
| WO | WO 2010/017482 A1 | 2/2010 |

OTHER PUBLICATIONS

"Investigation on Quantization Scheme of Explicit Spatial Channel Feedback for CoMP Joint Transmission in LTE-Advanced," #GPP TSG RAN WG1 Meeting #58bis, R1-094244, Miyazaki, Japan, Oct. 12-16, 2009, pp. 1-8.

Song Yang, et al., " . . . MIMO . . . ," Modern Science & Technology of Telecommunications, Dec. 12, 2005, pp. 31-35.

Chang Yongyu, et al., " . . . MIMO . . . ," Modern Science & Technology of Telecommunications, Jul. 2006, pp. 50-53.

* cited by examiner

DEVICE AND METHOD OF CHANNEL INFORMATION FEEDBACK FOR MULTI-CELL MIMO

FIELD OF THE INVENTION

The present invention relates to the wireless communication field, and more particularly to a device and method of channel information feedback for multi-cell MIMO.

BACKGROUND OF THE INVENTION

Up to now, for 3GPP LTE-A systems, channel feedback mechanisms for support of Downlink Coordinated Multi-Point (DL CoMP) are still under discussion and formulation. The existing solutions for channel feedback to enable the Downlink Coordinated Multi-Point transmission include: 1) Precoding Matrix Index (PMI) feedback; 2) Uplink (UL) sounding feedback; and 3) physical channel matrix feedback. The above feedback methods, however, have the following defects:

1) PMI feedback is more efficient in single Base Station (BS) transmission modes. However, in multi-cell transmission, the PMI feedback may largely limit the freedom of precoding operation of involved multiple cells.

2) UL sounding feedback is more efficient in Time Division Duplex (TDD) mode, but it is difficult to be applied in Frequency Division Duplex (FDD) mode. Additionally, asymmetric interference distribution among Downlink (DL) and Uplink (UL) will damage the accuracy of channel information estimation;

3) Physical channel matrix feedback will lead to too large feedback overhead. For example, the feedback solutions as described by NTT DoCoMo in Proposal R1-094244 in 3GPP RAN WG1 #58 bits meeting, no matter the channel vector quantization based method (case 1) or the channel element quantization based method (case 2), will lead to a large feedback overhead (e.g., up to 26.6 bits/subband/cell in case 1 and up to 53.3 bits/subband/cell in case 2), which may be unacceptable in practical systems.

SUMMARY OF THE INVENTION

In order to solve the above problems, a solution of Channel State Information (CSI) Channel Quality Information (CQI) feedback for support of Downlink Coordinated Multi-Point (DL CoMP) is proposed in the present invention. Specifically, the present invention provides a CSI feedback solution for support of DL CoMP and an associated CQI feedback solution, and the two solutions together form a whole channel information feedback solution for support of CoMP.

The main ideas of the present invention are as follows:

1) The CSI feedback consists of Channel Vector Quantization (CVQ) based per-cell Channel Directional Information (CDI) feedback and scalar quantization based inter-cell relative phase and/or amplitude feedbacks. The accuracy for the CDI feedback can be enhanced by transforming by a channel covariance matrix the codebook based on which the CVQ is performed.

2) The CQI feedback only corresponds to a serving cell and denotes the ratio of the signal power received from the serving cell and the noise plus interference power from cells out of the cooperating cell set. Here, the CQI feedback indicates a specific value of power ratio, and the final expected value of post-detection Signal to Interference plus Noise Ratio (SINR) may be derived by the base station from the CQI feedback and inter-cell relative amplitude feedbacks depending on the transmission mode applied.

According to one aspect of the present invention, a mobile terminal is provided, including: a channel state information feedback calculating unit configured to calculate a channel state information feedback between the mobile terminal and a serving cell of the mobile terminal and those between the mobile terminal and all cooperating cells; a channel quality information feedback calculating unit configured to calculate a channel quality information feedback for the serving cell of the mobile terminal; and a transmission unit configured to transmit the channel state information feedbacks and the channel quality information feedback to the serving cell.

Preferably, the channel state information feedback includes a channel vector quantization based per-cell channel directional information feedback and scalar quantization based inter-cell relative phase and/or amplitude feedbacks, and the channel state information feedback calculating unit includes: a channel directional information feedback calculating unit configured to calculate the channel vector quantization based per-cell channel directional information feedback; and a relative amplitude and/or phase feedback calculating unit configured to calculate the scalar quantization based inter-cell relative phase and/or amplitude feedbacks.

Preferably, the relative amplitude and/or phase feedback calculating unit includes at least one of: a relative amplitude feedback calculating subunit configured to calculate scalar quantization based inter-cell relative amplitude feedbacks; and a relative phase feedback calculating subunit configured to calculate scalar quantization based inter-cell relative phase feedbacks.

Preferably, the channel directional information feedback calculating unit transforms, by a channel covariance matrix, a codebook based on which the channel vector quantization is performed.

According to another aspect of the present invention, a base station is provided, including: a transmission unit configured to receive from a mobile terminal a channel state information feedback between the mobile terminal and a serving cell of the mobile terminal and those between the mobile terminal and all cooperating cells, as well as a channel quality information feedback for the serving cell of the mobile terminal; a Signal to Interference plus Noise Ratio calculating unit configured to calculate an expected post-detection Signal to Interference plus Noise Ratio based on the channel state information feedbacks and the channel quality information feedback received by the transmission unit, depending on a transmission mode applied; a user scheduling and transmission format determining unit configured to perform user scheduling and transmission format determination based on the post-detection Signal to Interference plus Noise Ratio; a coordinated multipoint pre-coder calculating unit configured to calculate a coordinated multipoint pre-coding matrix based on a channel state information feedback between a scheduled mobile terminal and a serving cell of the scheduled mobile terminal and those between the scheduled mobile terminal and all cooperating cells; and a coordinated multipoint pre-coding and transmitting unit configured to perform a corresponding pre-coding processing on user data and transmit the user data based on the coordinated multipoint pre-coding matrix calculated by the coordinated multipoint pre-coder calculating unit.

Preferably, the transmission format determination includes modulation and coding scheme determination.

Preferably, a Zero-Forcing algorithm or a Block-Diagonalization algorithm is used to implement the calculation of the coordinated multipoint pre-coder calculating unit.

According to a further aspect of the present invention, a channel information feedback method is provided, including: calculating a channel state information feedback between a mobile terminal and a serving cell of the mobile terminal and those between the mobile terminal and all cooperating cells; calculating a channel quality information feedback for the serving cell of the mobile terminal; and transmitting the channel state information feedbacks and the channel quality information feedback to the serving cell.

Preferably, the channel state information feedback includes a channel vector quantization based per-cell channel directional information feedback and scalar quantization based inter-cell relative phase and/or amplitude feedbacks.

Preferably, a codebook based on which the channel vector quantization is performed is transformed by a channel covariance matrix when calculating a channel directional information feedback, so as to improve the accuracy of the codebook based vector quantization.

According to still a further aspect of the present invention, a communication system is provided, including the mobile terminal and the base station described above.

The present invention may greatly improve the performance of the LTE-A system, and has the following advantages:

1) The vector quantization based per-cell CDI feedback and the scalar quantization based inter-cell relative phase and amplitude feedbacks may greatly reduce the feedback overhead.

2) A user only needs to feed back the CQI related to the serving cell and the base station can derive the CQIs of other cooperating cells according to the inter-cell CSI feedbacks, thereby further reducing the feedback overhead.

3) The present invention is a scalable feedback solution and may be flexibly applied to various CoMP transmission scenarios.

BRIEF DESCRIPTION OF THE DRAWINGS

The above and other features of the present invention will become more apparent from the following detailed description in connection with the accompanying drawings, in which.

DETAILED DESCRIPTION OF EMBODIMENTS

The principle and implementation of the present invention become more apparent by making references to the following description of specific embodiments of the present invention in conjunction with the accompanying drawings. It should be noted that the present invention shall not be restricted to the specific embodiments described below. In addition, for sake of conciseness, well known components directly related to the present invention are not shown in the accompanying drawings.

Figure 1:
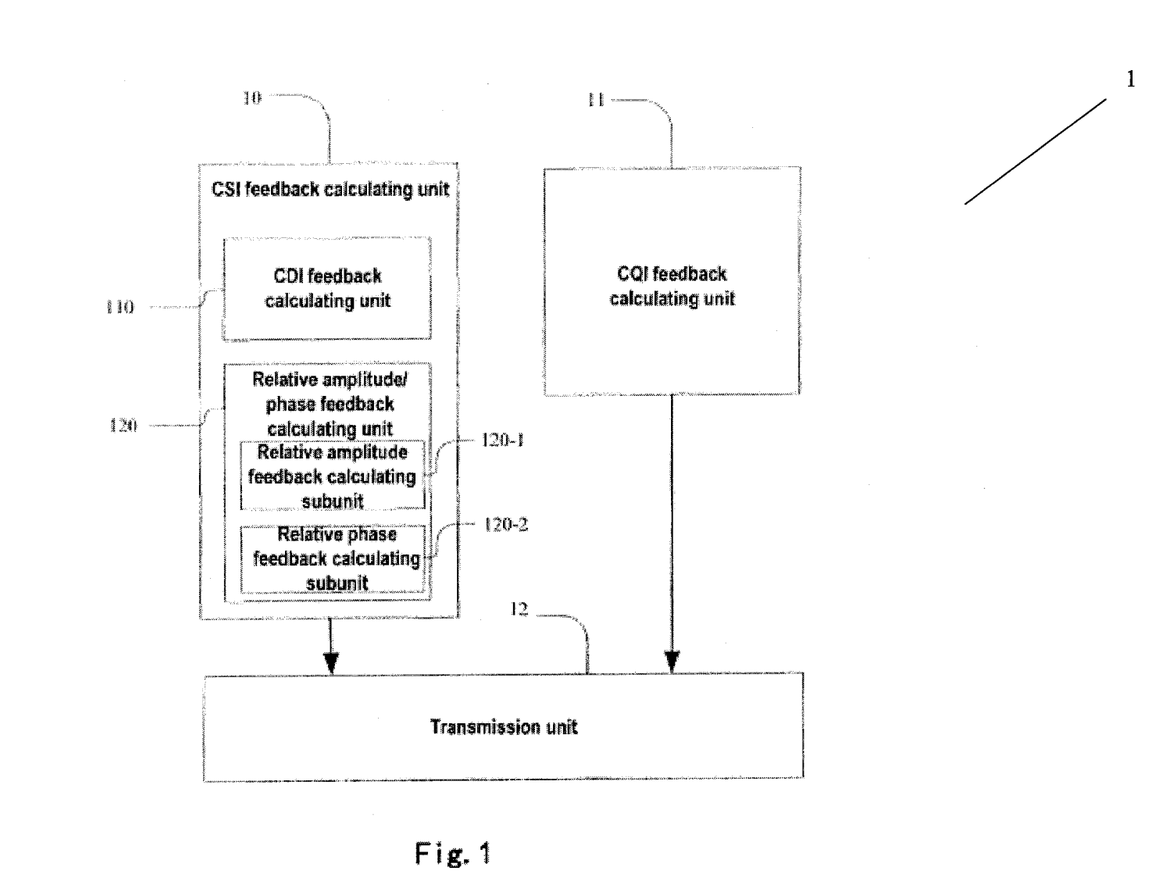
FIG. 1 is a block diagram illustrating a mobile terminal according to an embodiment of the present invention.

FIG. 1 is a block diagram illustrating a mobile terminal according to an embodiment of the present invention. In FIG. 1, the mobile terminal 1 includes a CSI feedback calculating unit 10, a CQI feedback calculating unit 11 and a transmission unit 12. The CSI feedback calculating unit 10 includes a CDI feedback calculating unit 110 and a relative amplitude/phase feedback calculating unit 120, and the relative amplitude/phase feedback calculating unit 120 further includes a relative amplitude feedback calculating subunit 120-1 and a relative phase feedback calculating subunit 120-2. In operation, the CSI feedback calculating unit 10 and the CQI feedback calculating unit 11 respectively calculate the CSI feedback and the CQI feedback, and transmit the calculated CSI feedback and CQI feedback to the transmission unit 12, which in turn transmit them to the serving cell. In the following, respective components of the mobile terminal 1 will be described in detail.

The CSI feedback calculating unit 10 includes a CDI feedback calculating unit 110 and a relative amplitude/phase feedback calculating unit 120 respectively configured to calculate a vector quantization based per-cell CDI feedback and scalar quantization based inter-cell relative phase and/or amplitude feedbacks. In the following, the channel between cell i∈S and the user is denoted as $H_i \in C^{N \times M}$, where S denotes the cooperating cell index set with size of |S| (i.e., the number of cells in the cooperating cell set), and $C^{N \times M}$ denotes N×M complex signal space, while M and N respectively indicate the number of antennas at the base station and the user terminal. Without loss of generality, it is assumed that the serving cell for the user has an index of k and all cooperating cells have the same number of transmit antennas.

The specific operation on how the CDT feedback calculating unit 110 calculates the per-cell CDI feedbacks for all channels from all cooperating cells to the user is described as below. In this example, the per-cell CDI feedback is based on the vector quantization depending on a codebook. The codebook is denoted as $V_i = \{V_{i,1}, V_{i,2}, \ldots, V_{i,L}\}$, where $V_{i,t} \in C^{M \times 1}$ represents the codewords with unit norm. Thus the number of bits required to index the codewords within the codebook may be expressed as $\log_2 L$, where L is the number of the codewords within the codebook. $C^{M \times 1}$ denotes M×1 complex signal space.

Firstly, the CDI feedback calculating unit 110 calculates a receiving vector W. An example of the receiving vector is the left dominant singular vector of the channel associated with the serving cell as follows:

$$H_k \stackrel{SVD}{=} [u_1 \ldots u_N] \sum [v_1 \ldots v_M]^H$$

where $u_i$ for i=1, ..., N and $v_j$ for j=1, ..., M denote left singular vectors and right singular vectors, respectively. The matrix Σ is a diagonal matrix with singular values in descending order. Generally, it is assumed that the number of data streams for per user is one. In this case, the receiving combing vector may be $$W = u_1$$

Then, the CDI feedback calculating unit 110 calculates the equivalent channels $h_i$, i∈S. Considering the receiving combining operation by the vector W, the equivalent channels between the cooperating cells i∈S and the user can be expressed as $h_i = W^H H_i \in C^{1 \times M}$.

Thereafter, the CDI feedback calculating unit 110 performs vector quantization for all the equivalent channels based on the codebook. Specifically speaking, the CDI feedback calculating unit 110 searches the codebook for a codeword that is closest to the normalized equivalent channel to be quantized:

$$\hat{h}_i = \underset{V_{i,l} \in V_i}{\operatorname{argmin}}\{d(\tilde{h}_i^T, V_{i,l})\}, i \in S \quad (1)$$

where and $\tilde{h}_i^T = h_i^T/\|h_i\|$ and $d(\tilde{h}_i^T, V_{i,l})$ denotes a distortion measure between the normalized equivalent channel (to be quantized) and the codeword $V_{i,l}$. For example, a most popular distortion measure is Euclidean distance metric, defined as follows:

$$d(\tilde{h}_i^T, V_{i,l}) = \|\tilde{h}_i^T - (V_{i,l}\tilde{h}_i^T)V_{i,l}\|^2$$

Under the Euclidean distance metric, it can be derived that Equation (1) is equivalent to $$\hat{h}_i = \underset{V_{i,l} \in V_i}{\operatorname{argmax}}\{|V_{i,l}^H \tilde{h}_i^T|\} \quad (2)$$

Finally, the CDI feedback calculating unit 110 provides the calculated CDI feedback to the transmission unit 12 so as to feed the index of the equivalent channel quantization back to its serving cell (i.e., cell k in the assumptions) via the transmission unit 12.

Optionally, accuracy of the codebook based vector quantization may be improved by transformation of the codebook using a cell-specific covariance matrix, as follows:

$$\hat{V}_{i,l} = \frac{R_i^{1/2} V_{i,l}}{\|R_i^{1/2} V_{i,l}\|}, l = 1, \ldots, L; i \in S$$

In this case, the equation (2) may be replaced with the following:

$$\hat{h}_i = \underset{V_{i,l} \in V_i}{\operatorname{argmax}}\{|\hat{V}_i^H \tilde{h}_i^T|\}$$

However, the per-cell CDI feedback only involves directional information of the equivalent channels but lacks of amplitude and/or phase information, which, however, is necessary for multi-cell coordinated precoding operations. Thus, the specific operation that the relative amplitude/phase feedback calculating unit 120 calculates the fed back amplitude/phase information is described as below. In the present invention, in order to save feedback overhead, only the relative values of the phase and amplitude of the equivalent channels of the non-serving cooperating cells relative to that of the serving cell are calculated.

The relative amplitude feedback calculating subunit 120-1 calculates relative phase information of the equivalent channel $h_i$ against the serving-cell channel $h_k$.

In particular, firstly, missed phases in the quantization of the equivalent channels are calculated as $$\theta_i = \text{angle}(\hat{h}_i^H \tilde{h}_i^T), i \in S$$

where function angle( ) returns the phase of the input complex value in the range of $[-\pi, \pi)$.

Secondly, phases of all non-serving cells against the serving cell are calculated as $$\tilde{\theta}_i = \theta_i - \theta_k \bmod 2\pi, i \in S \setminus k,$$

where the set S \ k represents a set of indexes of the cooperating cells other than the index k of the serving cell. It is to be noted that the mode $2\pi$ operation is performed to assure that the angle falls within the range of $[-\pi, \pi)$.

Thirdly, scalar quantization is performed on the obtained relative phases to obtain the indexes to be fed back:

$$\hat{\theta}_i = \underset{\theta_p \in \Theta}{\operatorname{argmin}}\{|\tilde{\theta}_i - \theta_p|\}, i \in S \setminus k$$

where $\Theta = [\theta_1, \theta_2 \ldots \theta_P]$ denotes the codebook for scalar quantization of relative phases. Assuming the relative phases are distributed evenly within the range of $[-\pi, \pi)$, the codebook for the scalar quantization may be designed as:

$$\Theta = [\underbrace{-\pi, -\pi + \Delta, \ldots, \pi - \Delta}_{P \text{ elements}}], \text{ where } \Delta = \frac{2\pi}{P}.$$

The relative phase feedback calculating subunit 120-2 calculates relative amplitude information of the equivalent channel $h_i$ the serving-cell channel $h_k$.

In particular, firstly, magnitudes of the equivalent channels after being projected onto its vector quantization ion version are calculated as $$A_i = |\hat{h}_i^H \tilde{h}_i^T| = \|h_i\| \cdot |\hat{h}_i^H \tilde{h}_i^T|, i \in S.$$

Secondly, relative amplitudes of all non-serving cells against the serving cell are calculated as $$\tilde{A}_i = \begin{cases} A_i/A_k, & \text{if } A_i < A_k \\ A_k/A_i, & \text{if } A_k \leq A_i \end{cases}, i \in S \setminus k.$$

It is to be noted that the relative amplitudes are constrained to (0, 1] depending on the relationship between $A_i$ and $A_k$, which will facilitate subsequent scalar quantization.

Thirdly, scalar quantization is performed on the obtained relative amplitudes to obtain the indexes to be fed back:

$$\hat{A}_i = \underset{A_q \in \Lambda}{\operatorname{argmin}}\{\tilde{A}_i, A_q\}$$

where $\Lambda = [A_1 \ A_2 \ldots A_Q]$ denotes the codebook for scalar quantization of relative amplitudes. It is to be noted that one bit indicating the relationship between $A_i$ and $A_k$ (e.g., 0 for $A_i < A_k$ and 1 otherwise) shall be fed back together with the index of $\hat{A}_i$ such that the base station can clearly reconstruct the relationship between different amplitudes of the equivalent channels. Assuming that the relative amplitudes are distributed evenly within the range of (0, 1], the codebook for the scalar quantization may be designed as:

$$\Lambda = [\underbrace{1/Q \ \ 2/Q \ \ \ldots \ \ 1}_{Q \text{ elements}}]$$

Finally, the relative amplitude/phase feedback calculating unit 120 provides the calculated relative amplitude feedbacks and relative phase feedbacks to the transmission unit 12 so as to feed them back to the serving cell (i.e., cell k in the assumptions) via the transmission unit 12.

In practical systems, CQI feedback is required to implement the channel-dependent user scheduling and transmission format determination (e.g., the modulation and coding scheme). Thus, an efficient CQI feedback solution is very important for system operations. In the traditional systems, a CQI feedback is nothing but a direct indicator for the recommended modulation and coding scheme. This CQI feedback is called as implicit CQI feedback in this application document. Implicit CQI feedback is an efficient scheme for single-cell operations, especially for Single User MIMO (SU-MIMO). However, for multi-cell transmissions, it is difficult or even impossible for the implicit CQI feedback to feed back the recommended modulation and coding scheme itself. Instead, in such a case, it is more convenient to feed back a specific value, based on which the base station can calculate the final channel quality for each involved user. This method is called as explicit CQI feedback in this application document.

The CQI feedback calculating unit 11 is an explicit CQI feedback calculating unit for multi-cell MIMO transmissions. The CQI feedback calculating unit 11 operates in conjunction with the CSI feedback calculating unit 10 described above such that the inter-cell relative amplitude feedbacks may be shared between CSI feedback and CQI feedback. Thus, the mobile terminal only needs to feed back the CQI related to the serving cell as follows:

$$\tilde{\gamma}_k = \frac{A_k^2}{P_{ni}} = \frac{\|h_k\| \cdot \left| \hat{h}_k^H \tilde{h}_k^T \right|}{P_n + \sum_{i \notin S} P_i}$$

It is to be noted that the CQI feedback can be based on scalar quantization, as follows:

$$\hat{\gamma}_k = \operatorname*{argmin}_{\gamma_g \in \Gamma} \{d(\tilde{\gamma}_k, \gamma_g)\}$$

where $\Gamma = [\gamma_1\ \gamma_2\ \ldots\ \gamma_G]$ denotes the codebook for the CQI scalar quantization, and $d(\tilde{\gamma}_k, \gamma_g)$ denotes the distortion measure. Finally, the CQI feedback calculating unit 11 provides the calculated CQI feedback to the transmission unit 12 so as to feed it back to the serving cell (i.e., cell k in the assumptions) via the transmission unit 12.

Figure 2:
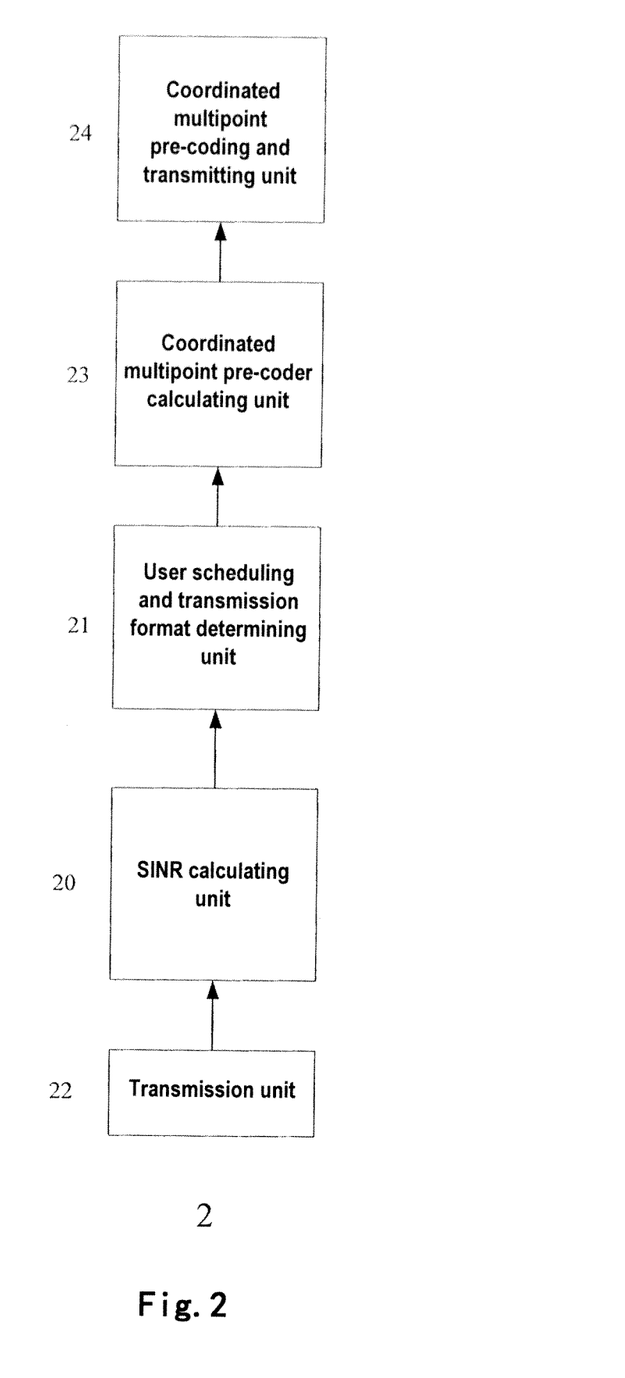
FIG. 2 is a block diagram illustrating a base station according to an embodiment of the present invention.

FIG. 2 is a block diagram illustrating a base station according to an embodiment of the present invention. In FIG. 2, the base station 2 includes a transmission unit 22, a SINR calculating unit 20, a user scheduling and transmission format determining unit 21, a coordinated multipoint pre-coder calculating unit 23 and a coordinated multipoint pre-coding and transmitting unit 24. In a case that the CQIs for non-serving cells are not fed back, the SINR calculating unit 20 in the base station firstly derives the CQI values corresponding to the non-serving cooperating cells based on the CQI feedback of the serving cell and the inter-cell relative amplitude feedbacks as follows:

$$\tilde{\gamma}_i = \begin{cases} \hat{\gamma}_k \cdot \hat{A}_i^2, & \text{for } A_i < A_k \\ \hat{\gamma}_k / \hat{A}_i^2, & \text{for } A_i \geq A_k \end{cases}, i \in S \setminus k.$$

Then, based on the obtained CQI values of the user associated with all the cooperating cells, the SINR calculating unit 20 may calculate the expected post-detection Signal to Interference plus Noise Ratio (SINR) depending on the transmission mode applied. Based on the calculated post-detection SINR, the user scheduling and transmission format determining unit 21 performs the user scheduling and transmission format determination (e.g., modulation and coding scheme determination).

The coordinated multipoint pre-coder calculating unit 23 calculates a coordinated multipoint pre-coding matrix based on a channel state information feedback between a scheduled user and a serving cell of the scheduled user and those between the scheduled user and all cooperating cells. In the calculation of the coordinated multipoint pre-coder, different downlink coordinated multipoint transmission modes need different channel state information feedbacks. Specifically, the coordinated multipoint scheduling/beamforming transmission mode only needs the codebook based per-cell channel directional feedback; the coordinated multipoint joint transmission mode based on per-cell local pre-coding needs inter-cell relative phase information in addition to the codebook based per-cell channel directional feedback information to enhance the transmission performance; for the coordinated multipoint joint transmission mode based on multi-cell global pre-coding, both the codebook based per-cell channel directional feedback information and the inter-cell relative phase and amplitude information are needed. The calculation of the coordinated multipoint pre-coder may be achieved based on a Zero-Forcing algorithm or a Block-Diagonalization algorithm.

Thereafter, the coordinated multipoint pre-coding and transmitting unit 24 performs a corresponding pre-coding processing on user data based on the coordinated multipoint pre-coding matrix calculated by the coordinated multipoint pre-coder calculating unit 23, and then transmits the pre-coded user data.

Figure 3:
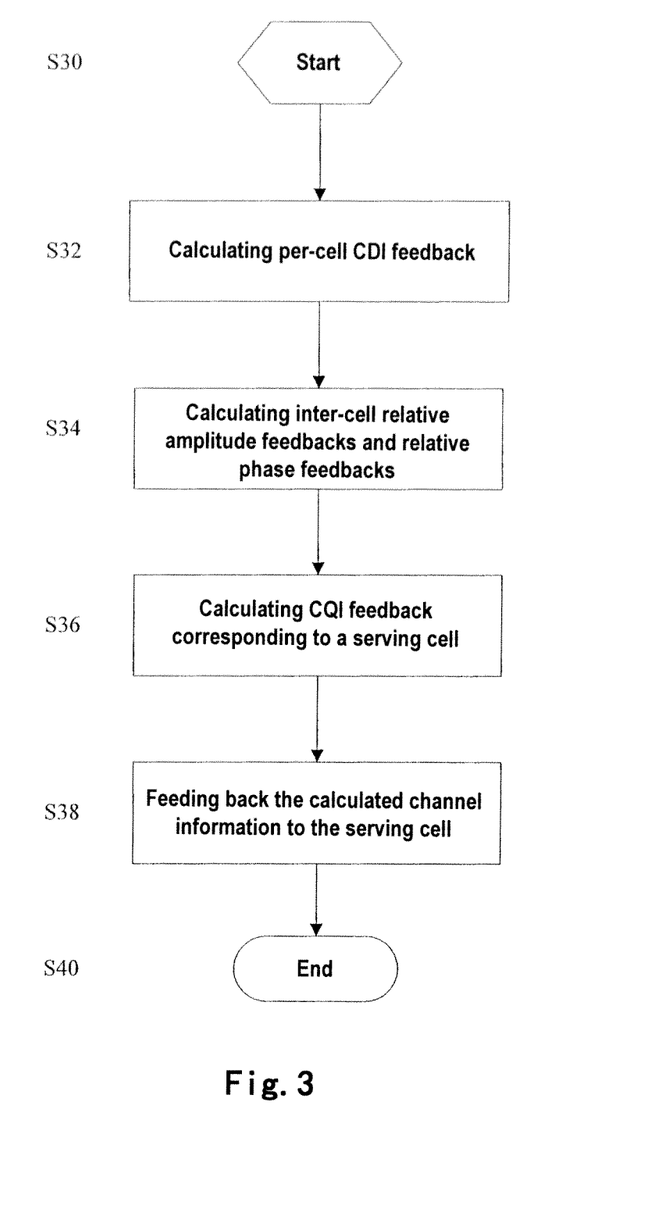
FIG. 3 is a flowchart illustrating a channel information feedback method performed by a mobile terminal according to an embodiment of the present invention.

FIG. 3 is a flowchart illustrating a channel information feedback method performed by a mobile terminal according to an embodiment of the present invention. The method starts at Step S30. At Step S32, the Channel Vector Quantization (CVQ) based per-cell Channel Directional Information (CDI) feedback is calculated. At Step S34, the scalar quantization based inter-cell relative amplitude and/or phase feedbacks are calculated. At Step S36, the CQI feedback corresponding to a serving cell is calculated. At Step S38, the calculated channel information is fed back to the serving cell. Finally, the method ends at Step S40.

Figure 4:
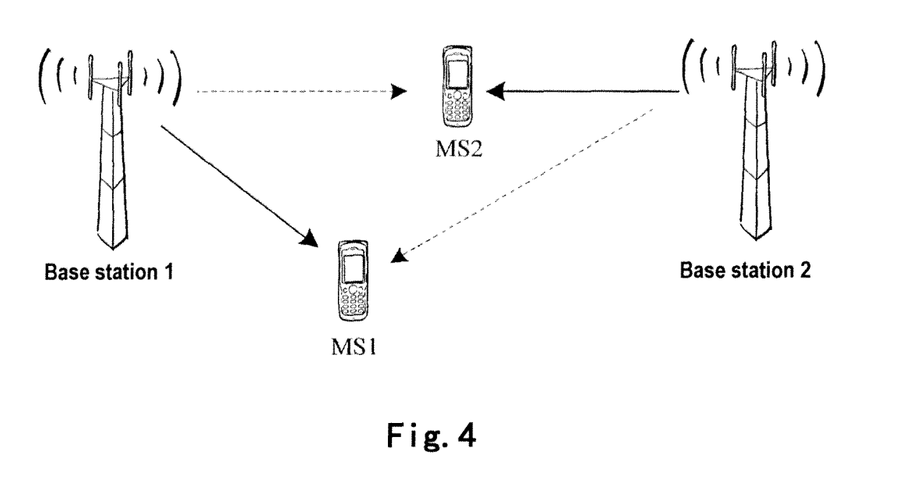
FIG. 4 is an illustrative communication system including the mobile terminal and the base station according to the present invention.

FIG. 4 is an illustrative communication system including the mobile terminal and the base station according to the present invention. The communication system includes Mobile Terminals MS1 and MS2 and Base Station 1 and Base Station 2. For example, Mobile Terminals MS1 and MS2 may be the mobile terminal of the present invention as shown in FIG. 1, and Base Station 1 and Base Station 2 may be the base station of the present invention as shown in FIG. 2. In FIG. 4, Mobile Terminals MS1 and MS2 respectively transmit respective downlink coordinated multipoint CSI and CQI feedbacks to respective serving cell, and Base Station 1 and Base Station 2 calculate the post-detection SINR based on the feedback information, and perform user scheduling and transmission format determination based on the SINR.

Although the present invention has been illustrated above by making references to the preferred embodiments of the present invention, those skilled in the art will understand that various modifications, replacements and changes may be made on the present invention without departure from the spirit and scope of the present invention. Thus, the present invention shall be defined by the appended claims and their equivalents, rather than the embodiments described above.

What is claimed is:

1. A mobile terminal, comprising:
a channel state information feedback calculating unit configured to calculate channel state information feedback between the mobile terminal and a serving cell of the mobile terminal and between the mobile terminal and all cooperating cells;
a channel quality information feedback calculating unit configured to calculate channel quality information feedback for the serving cell of the mobile terminal; and
a transmission unit configured to transmit the channel state information feedback and the channel quality information feedback to the serving cell,
wherein the channel state information feedback includes a channel vector quantization-based per-cell channel directional information feedback and scalar quantization-based inter-cell relative phase and amplitude feedback, and the channel state information feedback calculating unit comprises:
a channel directional information feedback calculating unit configured to calculate the channel vector quantization-based per-cell channel directional information feedback; and
a relative phase and amplitude feedback calculating unit configured to calculate the scalar quantization-based inter-cell relative phase and amplitude feedback.

2. The mobile terminal according to claim 1, wherein the relative phase and amplitude feedback calculating unit comprises at least one of:
a relative amplitude feedback calculating subunit configured to calculate scalar quantization based inter-cell relative amplitude feedback; and
a relative phase feedback calculating subunit configured to calculate scalar quantization based inter-cell relative phase feedback.

3. The mobile terminal according to claim 1, wherein the channel directional information feedback calculating unit transforms, by a channel covariance matrix, a codebook based on which the channel vector quantization is performed.

4. A base station, comprising:
a transmission unit configured to receive from a mobile terminal channel state information feedback between the mobile terminal and a serving cell of the mobile terminal and between the mobile terminal and all cooperating cells, as well as a channel quality information feedback for the serving cell of the mobile terminal;
a Signal to Interference plus Noise Ratio calculating unit configured to calculate an expected post-detection Signal to Interference plus Noise Ratio based on the channel state information feedback and the channel quality information feedback received by the transmission unit, depending on a transmission mode applied;
a user scheduling and transmission format determining unit configured to perform user scheduling and transmission format determination based on the post-detection Signal to Interference plus Noise Ratio;
a coordinated multipoint pre-coder calculating unit configured to calculate a coordinated multipoint pre-coding matrix based on a-channel state information feedback between a scheduled mobile terminal and a serving cell of the scheduled mobile terminal and between the scheduled mobile terminal and all cooperating cells; and
a coordinated multipoint pre-coding and transmitting unit configured to perform a corresponding pre-coding processing on user data and transmit the user data based on the coordinated multipoint pre-coding matrix calculated by the coordinated multipoint pre-coder calculating unit.

5. The base station according to claim 4, wherein the transmission format determination comprises modulation and coding scheme determination.

6. The base station according to claim 4, wherein a Zero-Forcing algorithm or a Block-Diagonalization algorithm is used to implement the calculation of the coordinated multipoint pre-coder calculating unit.

7. A channel information feedback method, comprising:
calculating channel state information feedback between a mobile terminal and a serving cell of the mobile terminal and between the mobile terminal and all cooperating cells;
calculating channel quality information feedback for the serving cell of the mobile terminal; and
transmitting the channel state information feedback and the channel quality information feedback to the serving cell,
wherein the channel state information feedback includes a channel vector quantization-based per-cell channel directional information feedback and scalar quantization-based inter-cell relative phase and amplitude feedback.

8. The channel information feedback method according to claim 7, wherein a codebook based on which the channel vector quantization is performed is transformed by a channel covariance matrix when calculating a channel directional information feedback.

9. A communication system, comprising:
a mobile terminal, the mobile terminal comprising:
a channel state information feedback calculating unit configured to calculate channel state information feedback between the mobile terminal and a serving cell of the mobile terminal and between the mobile terminal and all cooperating cells,
a channel quality information feedback calculating unit configured to calculate channel quality information feedback for the serving cell of the mobile terminal, and
a transmission unit configured to transmit the channel state information feedback and the channel quality information feedback to the serving cell; and
a base station comprising:
a transmission unit configured to receive from the mobile terminal channel state information feedback between the mobile terminal and a serving cell of the mobile terminal and between the mobile terminal and all cooperating cells, as well as channel quality information feedback for the serving cell of the mobile terminal, and
a Signal to Interference plus Noise Ratio calculating unit configured to calculate an expected post-detection Signal to Interference plus Noise Ratio based on the channel state information feedback and the channel quality information feedback received by the transmission unit, depending on a transmission mode applied, a user scheduling and transmission format determining unit configured to perform user scheduling and transmission format determination based on the post-detection Signal to Interference plus Noise Ratio, a coordinated multipoint pre-coder calculating unit configured to calculate a coordinated multipoint pre-coding matrix based on a channel state information feedback between a scheduled mobile terminal and a serving cell of the scheduled mobile terminal and between the scheduled mobile terminal and all cooperating cells, and a coordinated multipoint pre-coding and transmitting unit configured to perform a corresponding pre-coding processing on user data and transmit the user data based on the coordinated multipoint pre-coding matrix calculated by the coordinated multipoint pre-coder calculating unit.

\* \* \* \* \*